(12) United States Patent
Zou et al.

(10) Patent No.: US 8,147,238 B1
(45) Date of Patent: Apr. 3, 2012

(54) MOLD HAVING SLIDERS

(75) Inventors: Ya-bo Zou, Tu Cheng (TW); Gang-fu Cai, Tu Cheng (TW); Kun-hsueh Chiang, Tu Cheng (TW); Xin-jin Gui, Tu Cheng (TW)

(73) Assignee: Cheng Uei Precision Industry Co., Ltd., Tu Cheng, Taipei (TW)

( * ) Notice: Subject to any disclaimer, the term of this patent is extended or adjusted under 35 U.S.C. 154(b) by 0 days.

(21) Appl. No.: 12/959,744

(22) Filed: Dec. 3, 2010

(51) Int. Cl.
*B29C 45/33* (2006.01)

(52) U.S. Cl. .. 425/577; 425/438; 425/468; 425/DIG. 58

(58) Field of Classification Search .................. 425/577, 425/438, 468, DIG. 58
See application file for complete search history.

(56) References Cited

U.S. PATENT DOCUMENTS

| | | | | |
|---|---|---|---|---|
| 5,814,356 | A * | 9/1998 | Ito et al. | 425/577 |
| 7,175,421 | B2 * | 2/2007 | Takemoto et al. | 425/577 |
| 7,264,465 | B2 * | 9/2007 | Schwaiger et al. | 425/577 |

FOREIGN PATENT DOCUMENTS

| | | | |
|---|---|---|---|
| JP | 7-241883 | * | 9/1995 |
| JP | 9-57796 | * | 3/1997 |
| JP | 11-198193 | * | 7/1999 |

* cited by examiner

*Primary Examiner* — James Mackey
(74) *Attorney, Agent, or Firm* — Cheng-Ju Chiang

(57) ABSTRACT

Disclosed is a mold having sliders, comprising a fixed half, an angle pin, a slider pushing element, a moving half, a main block, a driving block and a sub-block. The angle pin comprises an angle pin body; the slider pushing element has a push face and a pull back face; the main block is installed on the moving half and driven by the angle pin body; the driving block is installed on the main block and has a driving face in accordance with the push face, and a push slope and a pull slope are formed at the other end; the sub-block is slidably installed on the main block and has a push out face in accordance with the push slope, the sub-block can be driven by the push slope and driven by the pull slope to be initialized. The present invention can simplify the complicated structure of a mold.

1 Claim, 6 Drawing Sheets

100

MOLD HAVING SLIDERS

BACKGROUND OF THE INVENTION

1. Field of the Invention

The present invention generally relates to a mold, and more particularly to a mold having sliders.

2. Description of Prior Art

Generally, in an injection mold, a mold structure has to be designed as more complicated accordingly when the shape of the injection molded product is complicated.

Please refer to FIG. 10, which shows an injection molded product 70 with a recessed-shape lateral extension structure 71. An inner hole 72 is further formed at the upper side of the inner wall of the lateral extension structure 71.

However, the mold structures of prior art cannot realize to form the lateral extension structure 71 and the inner hole 72 at the same time when the molds of prior arts are utilized to form the injection molded product 70.

SUMMARY OF THE INVENTION

For solving the drawbacks of aforementioned prior art, an objective of the present invention is to provide an injection mold having sliders in which a lateral extension structure and an inner hole at the inner wall of the lateral extension structure can be formed as the injection molded product is formed at the same time.

For realizing the aforesaid objective, the present invention provides a mold having sliders, comprising a fixed half, an angle pin, a slider pushing element, a moving half, a main block, a driving block and a sub-block. The angle pin is fixed on the fixed half and comprises a straight part and an angle pin body formed by the bottom of the straight part extending aslant and downwards; a slider pushing element, being fixed on the fixed half and comprising a push face extending aslant and a pull back face; a moving half, being positioned in accordance with the fixed half; a main block, being transversely slidably installed on the moving half, and enclosing with the moving half and the fixed half to form a cavity, an angle pin slot is formed on the main block and the angle pin can be relatively movably dipped into the angle pin slot, and the main block is driven with the angle pin body thereby; a driving block, being slidably installed on the main block, and a driving face in accordance with the push face and a pulling face in accordance with the pull back face are formed at one end of the driving block, and a push slope and a pull slope are formed at the other end of the driving block; and a sub-block, being up and down slidably installed on the main block and comprising a molding part, and a push out face in accordance with the push slope and a pull back face in accordance with the pull slope are formed at the other end of the sub-block opposite to the molding part, and the sub-block can be driven by the push slope of the driving block to make the molding part dip into the cavity and then can be driven by the pull slope to be initialized; wherein the push face of the slider pushing element can continue to push the driving block to move the driving block relative to the main block and the sub-block is driven by the push slope of the driving block to make the molding part dip into the cavity after the main block is pushed by the angle pin body to be in position, and in this stage, the straight part of the angle pin is moved up and down in the angle pin slot; the driving block can be pulled back by the pull back face of the slider pushing element to be initialized in a mold closing process.

As aforementioned, the mold having sliders of the present invention can utilize the main block, the moving half and the fixed half to form a lateral extension structure and to form an inner hole at the inner wall of the lateral extension structure with the sub-block and the driving mechanism thereof.

DETAILED DESCRIPTION OF THE INVENTION

For a better understanding the aforementioned content of the present invention, preferable embodiments are illustrated in accordance with the attached figures for further explanation.

Figure 1:
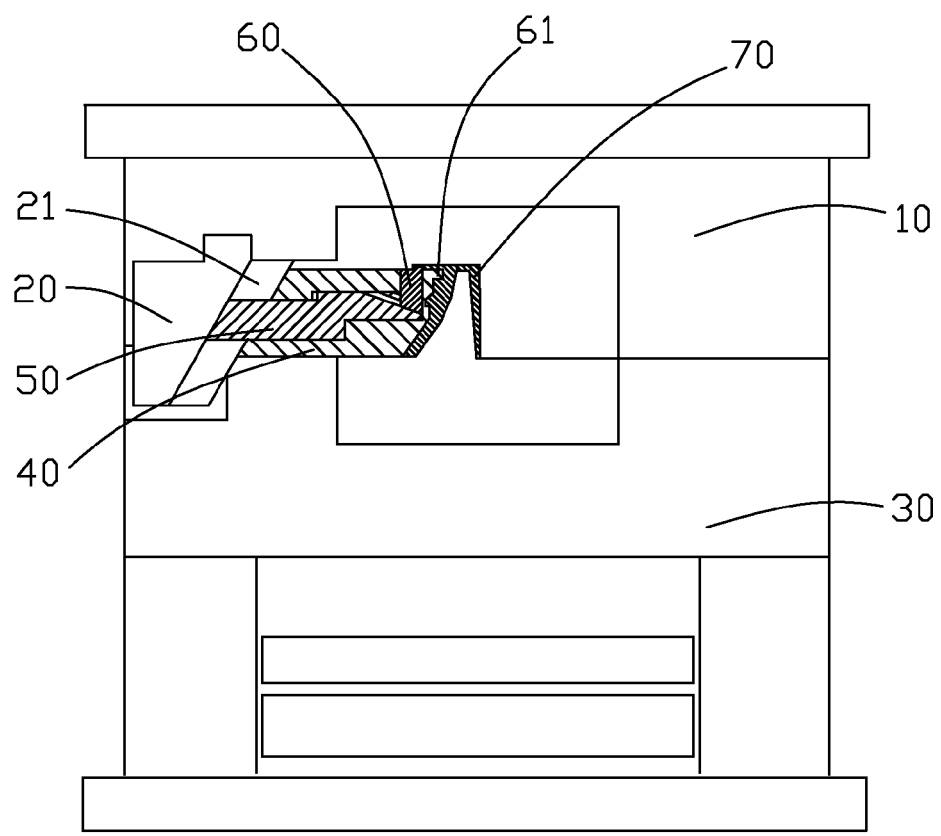
FIG. 1 shows a front sectional partial view diagram of a mold having sliders in close status according to the present invention.

Please refer to FIG. 1. The mold 100 having sliders is employed for molding a product 70. The mold 100 having sliders comprises a fixed half 10, a slider pushing element 20 fixed on the fixed half 10, a moving half 30 positioned in accordance with the fixed half 10, a main block 40, a driving block 50 and a sub-block 60.

Figure 2:
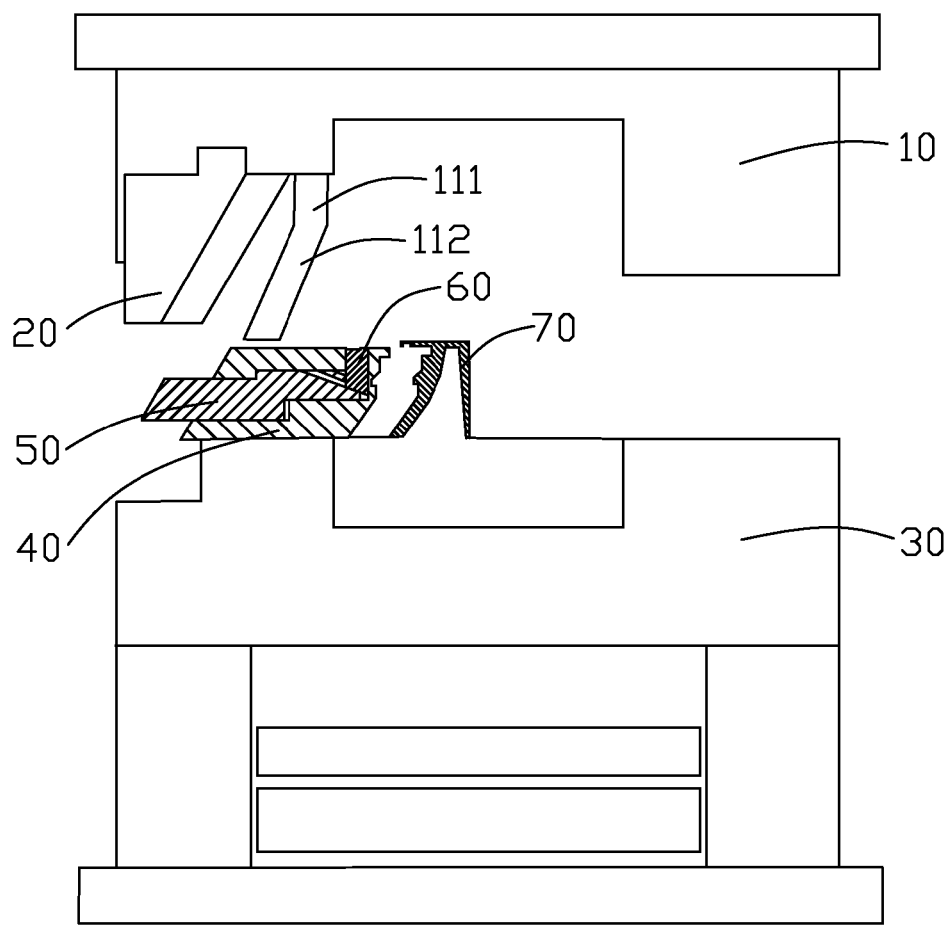
FIG. 2 shows a partial front sectional view diagram of the mold having sliders shown in FIG. 1 in close status.
Figure 4:
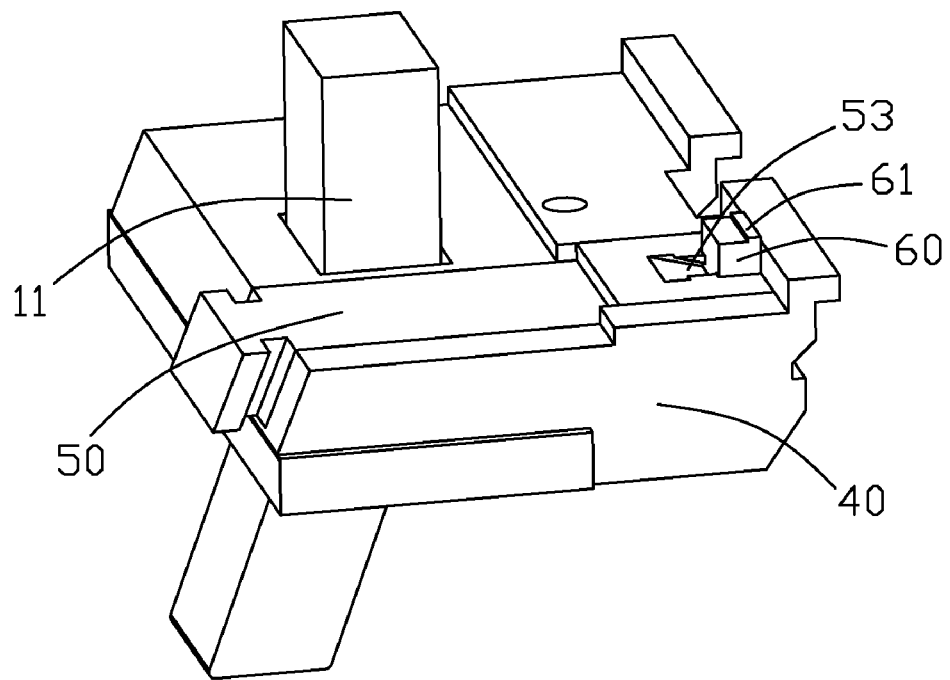
FIG. 4 shows a three dimensional view of an angle pin, the main block, the driving block and the sub-block of the mold having sliders shown in FIG. 1.

Please refer to FIG. 2 and FIG. 4. An angle pin 11 is fixed on the fixed half 10. The angle pin 11 comprises a straight part 111 and an angle pin body 112 formed by the bottom of the straight part 111 extending aslant and downwards.

Figure 5:
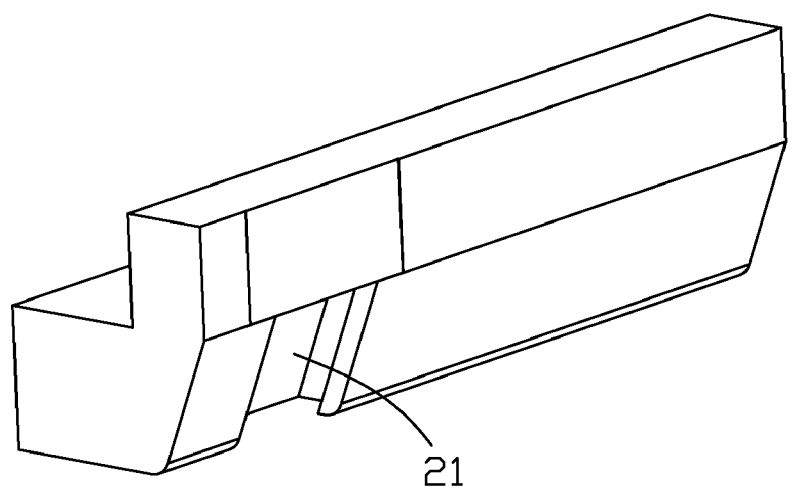
FIG. 5 shows a three dimensional view of a slider pushing element of the mold having sliders shown in FIG. 1.
Figure 6:
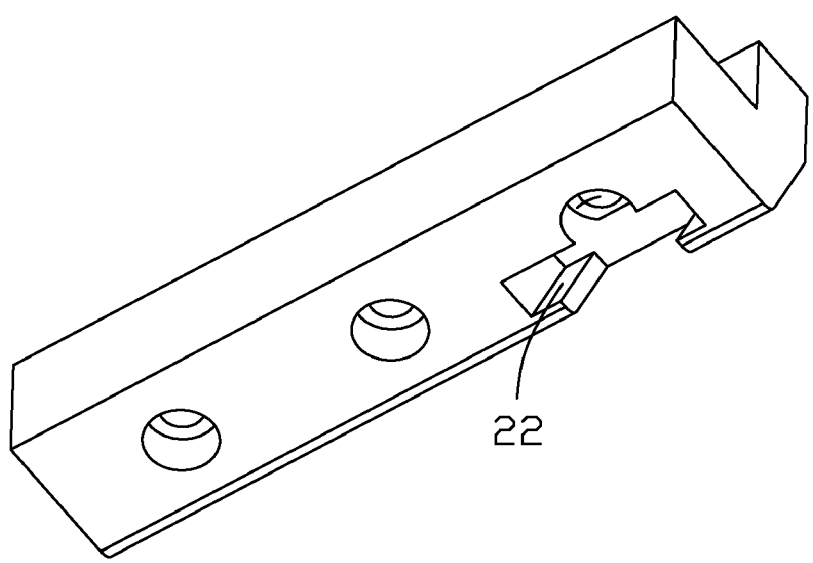
FIG. 6 shows a three dimensional view of the slider pushing element of the mold having sliders shown in FIG. 1 from another angle.
Figure 7:
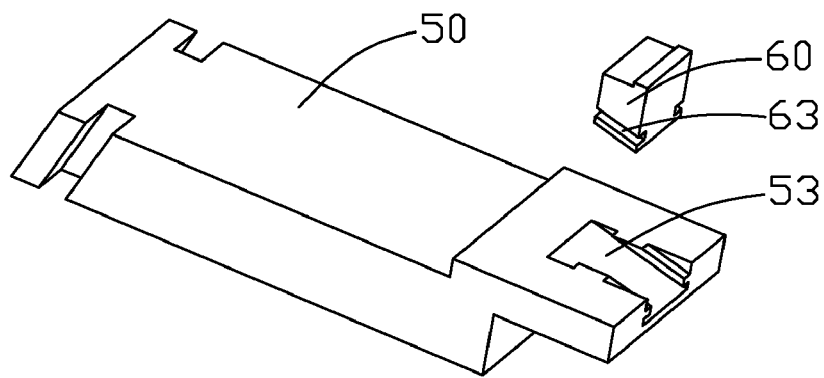
FIG. 7 shows an exploded assembly diagram of the driving block and the sub-block of the mold having sliders shown in FIG. 1.
Figure 8:
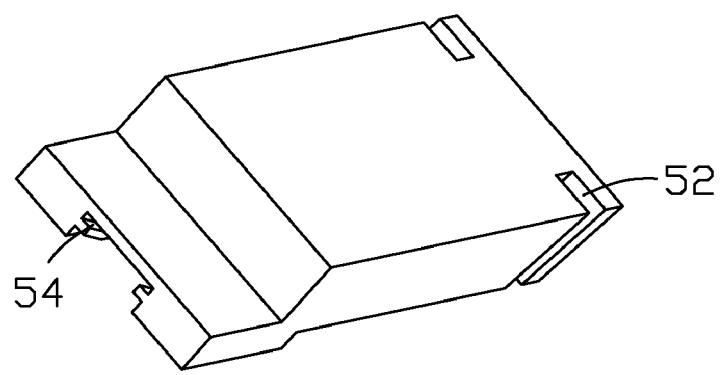
FIG. 8 shows a three dimensional view of the driving block of the mold having sliders shown in FIG. 1.
Figure 9:
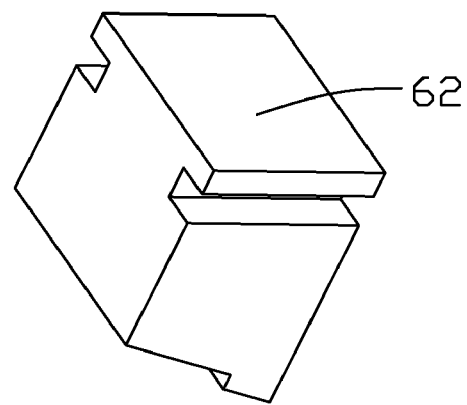
FIG. 9 shows a three dimensional view of the sub-block of the mold having sliders shown in FIG. 1.

Please refer to FIG. 2, FIG. 5 and FIG. 6. The slider pushing element 20 comprises a push face 21 extending aslant and a pull back face 22.

Figure 3:
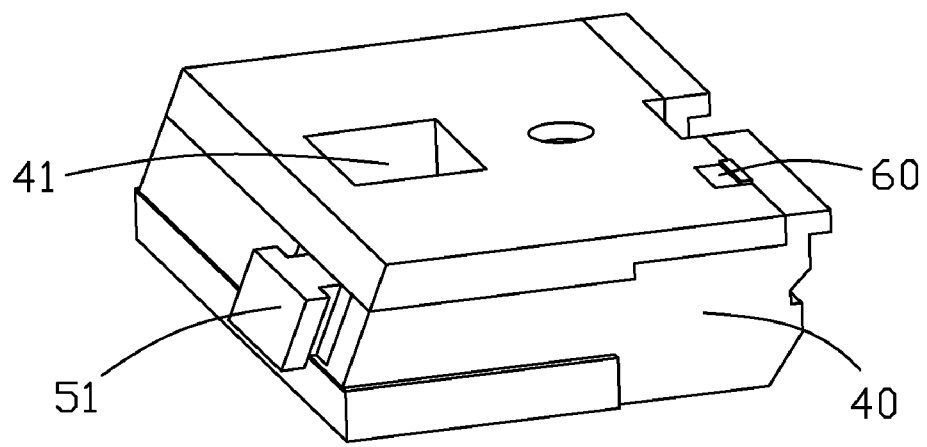
FIG. 3 shows a three dimensional view diagram of a main block, a driving block and a sub-block of the mold having sliders shown in FIG. 1.

Please refer to FIG. 2, FIG. 3 and FIG. 4. The main block 40 is transversely slidably installed on the moving half 30. The main block 40, the moving half 30 and the fixed half 10 can enclose to form a cavity. An angle pin slot 41 is formed on the main block 40 and does not interfere with the driving block 50. The angle pin 11 can be relatively movably dipped into the angle pin slot 41. Therefore, the main block 40 can be driven by the angle pin body 112 of the angle pin 11.

Please refer to FIG. 2, FIG. 4, FIG. 7 and FIG. 8. The driving block 50 is slidably installed on the main block 40. A driving face 51 in accordance with the push face 21 and a pulling face 52 in accordance with the pull back face 22 are formed at one end of the driving block 50, and a push slope 53 and a pull slope 54 are formed at the other end of the driving block.

Please refer to FIG. 2, FIG. 4, FIG. 7, FIG. 8 and FIG. 9. The sub-block 60 is up and down slidably installed on the main block 40. The sub-block 60 comprises a molding part 61. A push out face 62 in accordance with the push slope 53 and a pull back face 63 in accordance with the pull slope 54 are formed at the other end of the sub-block 60 opposite to the molding part 61. The sub-block 60 can be driven by the push slope 53 of the driving block 50 to make the molding part 61 dip into the cavity. And then, the sub-block 60 can be driven by the pull slope 54 to be initialized.

Figure 10:
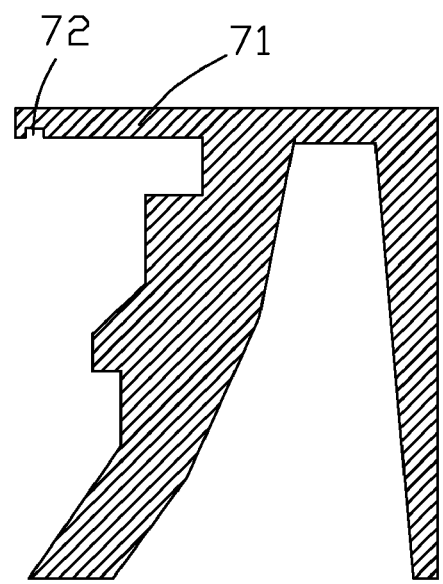
FIG. 10 shows a side sectional view diagram of an injection molded product manufactured by the mold having sliders according to the present invention.

Please refer to FIG. 10. The injection molded product 70 has a recessed-shape lateral extension structure 71. An inner hole 72 is further formed at the upper side of the inner wall of the lateral extension structure 71.

Please refer from FIG. 1 to FIG. 10. In the mold closing process of the mold 100 having sliders according to the present invention, the push face 21 of the slider pushing element 20 can continue to push the driving block 50 to move the driving block 50 relative to the main block 40 and accordingly, the sub-block 60 is driven by the push slope 53 of the driving block 50 to make the molding part 61 dip into the cavity after the main block 40 is pushed by the angle pin body 112 to be in position. In this stage, the straight part 111 of the angle pin 11 is moved up and down in the angle pin slot 41. When the mold 100 having sliders is opened, the driving block 50 can be pulled back by the pull back face 22 of the slider pushing element 20 to be initialized. The sub-block 60 can be driven by the pull slope 54 to be initialized by the sliding of the driving block 50. At this moment, the angle pin body 112 of the angle pin 11 does not act to the main block 40. When straight part 111 of the angle pin 11 is withdrawn out from the angle pin slot 41 completely, the angle pin body 112 of the angle pin 11 acts to the main block 40 and drives the main block slide outwards.

As aforementioned, the mold 100 having sliders of the present invention can utilize the main block 40, the moving half 30 and the fixed half 10 to form a lateral extension structure 71 and to form the inner hole 72 at the inner wall of the lateral extension structure 71 with the sub-block 60 and the driving mechanism thereof.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A mold having sliders, employed for manufacturing an injection molded product, comprising:
    a fixed half;
    an angle pin, being fixed on the fixed half and comprising a straight part and an angle pin body formed by the bottom of the straight part extending aslant and downwards;
    a slider pushing element, being fixed on the fixed half and comprising a push face extending aslant and a pull back face;
    a moving half, being positioned in accordance with the fixed half;
    a main block, being transversely slidably installed on the moving half, and enclosing with the moving half and the fixed half to form a cavity, an angle pin slot is formed on the main block and the angle pin can be relatively movably dipped into the angle pin slot, and the main block is driven with the angle pin body thereby;
    a driving block, being slidably installed on the main block, and a driving face in accordance with the push face and a pulling face in accordance with the pull back face are formed at one end of the driving block, and a push slope and a pull slope are formed at the other end of the driving block; and
    a sub-block, being up and down slidably installed on the main block and comprising a molding part, and a push out face in accordance with the push slope and a pull back face in accordance with the pull slope are formed at the other end of the sub-block opposite to the molding part, and the sub-block can be driven by the push slope of the driving block to make the molding part dip into the cavity and then can be driven by the pull slope to be initialized;
    wherein the push face of the slider pushing element can continue to push the driving block to move the driving block relative to the main block and the sub-block is driven by the push slope of the driving block to make the molding part dip into the cavity after the main block is pushed by the angle pin body to be in position, and in this stage, the straight part of the angle pin is moved up and down in the angle pin slot; the driving block can be pulled back by the pull back face of the slider pushing element to be initialized in a mold closing process.

* * * * *